(12) United States Patent
Chen et al.

(10) Patent No.: US 8,711,299 B2
(45) Date of Patent: Apr. 29, 2014

(54) BUFFERING STOP STRUCTURE AND CORRESPONDING PACKING CASE

(75) Inventors: Shih Hsiang Chen, Shenzhen (CN); Yicheng Kuo, Shenzhen (CN); Jiahe Cheng, Shenzhen (CN); Quan-shuang Hu, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 129 days.

(21) Appl. No.: 13/574,596

(22) PCT Filed: May 8, 2012

(86) PCT No.: PCT/CN2012/075161
§ 371 (c)(1),
(2), (4) Date: Jul. 20, 2012

(87) PCT Pub. No.: WO2013/163820
PCT Pub. Date: Nov. 7, 2013

(65) Prior Publication Data
US 2013/0293803 A1    Nov. 7, 2013

(30) Foreign Application Priority Data
May 4, 2012    (CN) .......................... 2012 1 0137259

(51) Int. Cl.
*G02F 1/1333*    (2006.01)

(52) U.S. Cl.
USPC .............................................. 349/58; 349/60

(58) Field of Classification Search
USPC ...................................... 349/58, 60
See application file for complete search history.

(56) References Cited

U.S. PATENT DOCUMENTS

2007/0227935 A1    10/2007  Saito

FOREIGN PATENT DOCUMENTS

| CN | 200954932 Y | 10/2007 |
| CN | 101234693 A | 8/2008 |
| JP | 6-115550 A | 4/1994 |
| JP | 2000-109136 A | 4/2000 |

*Primary Examiner* — Phu Vu
(74) *Attorney, Agent, or Firm* — Muncy, Geissler, Olds & Lowe, P.C.

(57) ABSTRACT

The present invention relates to a buffering stop structure and a corresponding packing case. The buffering stop structure is disposed at a connecting corner between adjoining side surfaces of a corresponding case main body. The case main body is used to load a liquid crystal display (LCD) panel. The buffering stop structure comprises a fixing portion, a connecting portion and a case buffering portion. The manufacture cost of the buffering stop structure and the corresponding packing case of the present invention is lower, and the buffering effect thereof is better, so as to solve the problems of the packing case of existing technology that has higher manufacture cost and may cause environment pollution.

15 Claims, 2 Drawing Sheets

BUFFERING STOP STRUCTURE AND CORRESPONDING PACKING CASE

FIELD OF THE INVENTION

The present invention relates to a field of packing technology, and more particularly to a buffering stop structure and a corresponding packing case which are used for packing a liquid crystal panel.

BACKGROUND OF THE INVENTION

With the rapid advancement and development of liquid crystal display technology, a traditional cathode ray tube (CRT) is gradually weeded out because it has problems that it will occupy more space and waste great quantity of energy, so it is replaced by a liquid crystal display (LCD). However, because the LCD has characters of light-thin and fragile, the requirement of a corresponding packing case is higher.

A traditional packing case of the LCD as shown in FIG. 1, a structural schematic view of a packing case of existing technology is illustrated in FIG. 1. The packing case comprises a case main body, wherein fixing structures for fitting the size and shape of the LCD panel are disposed inside the case main body. It further uses stuffs to fill unused spaces, so as to decrease an external impact force, so it can prevent the LCD from being damaged by the impact force. The material of the case main body is general used EPP (expanded polypropylene) or EPO (a mixture by expanded polystyrene and polyethylene). However, the case main body of EPP has good character of buffering, but its material and the manufacture cost are higher, and the shrinkage rate thereof is larger, so that it is difficult to control the size; and the case main body of EPO is difficult to be decomposed, so it may be causes a problem of environment pollution.

As a result, it is necessary to provide a buffering stop structure and a corresponding packing case to solve the problems existing in the conventional technologies.

SUMMARY OF THE INVENTION

One of the objects of the present invention is to provide a buffering stop structure and a corresponding packing case. The manufacture cost of the packing case is lower, and the buffering effect thereof is better, so as to solve the problems of the packing case of existing technology that has higher the manufacture cost and may cause environment pollution.

To solve above-mentioned problem, the present invention is provided with technical solutions, as follows:

The present invention relates to a buffering stop structure, which is disposed at a connecting corner between adjoining side surfaces of a case main body, and the case main body loads a corresponding liquid crystal display (LCD) panel, wherein the buffering stop structure comprises:

a fixing portion disposed inside the case main body, and contacted with the corresponding LCD panel to fix the LCD panel;

a connecting portion connected with the case main body; and a case buffering portion protruding from the outer surface of the case main body to decrease an external impact force to the case main body, wherein the buffering portion is connected with the fixing portion and the connecting portion, respectively;

wherein the buffering stop structure are disposed at four corners of the case main body;

wherein the fixing portion is simultaneously in contact with adjoining two side edges of the LCD panel; and wherein the connecting portion comprises at least one groove structure, the groove structure is engaged with a corresponding rib structure of the case main body.

In the buffering stop structure of the present invention, the buffering stop structure further comprises a panel buffering portion, which decreases the external impact force to the LCD panel; and the panel buffering portion is in contact with a bottom surface of the LCD panel.

In the buffering stop structure of the present invention, the material of the buffering stop structure is expanded polypropylene.

The present invention further relates to a buffering stop structure, which is disposed at a connecting corner between adjoining side surfaces of a case main body, and the case main body loads a corresponding liquid crystal display (LCD) panel, wherein the buffering stop structure comprises:

a fixing portion disposed inside the case main body, and contacted with the corresponding LCD panel to fix the LCD panel;

a connecting portion connected with the case main body; and a case buffering portion protruding from the outer surface of the case main body to decrease an external impact force to the case main body, wherein the buffering portion is connected with the fixing portion and the connecting portion, respectively.

In the buffering stop structure of the present invention, the buffering stop structure is disposed at four corners of the case main body.

In the buffering stop structure of the present invention, the fixing portion is simultaneously in contact with adjoining two side edges of the LCD panel.

In the buffering stop structure of the present invention, the connecting portion comprises at least one groove structure, the groove structure is engaged with a corresponding rib structure of the case main body.

In the buffering stop structure of the present invention, the buffering stop structure further comprises a panel buffering portion, which decreases the external impact force to the LCD panel; and the panel buffering portion is in contact with a bottom surface of the LCD panel.

In the buffering stop structure of the present invention, the material of the buffering stop structure is expanded polypropylene.

The present invention further relates to a packing case, comprising: a case main body, which is used to load a corresponding LCD panel, and comprises a bottom surface and four side surface, wherein the four side surfaces are disposed at one side edge of the bottom surface, respectively, and are perpendicular to the bottom surface; and a buffering stop structure, which is disposed at a connecting corner between adjoining side surfaces of a case main body, and comprises: a fixing portion disposed inside the case main body, and contacted with the corresponding LCD panel to fix the LCD panel; a connecting portion connected with the case main body; a case buffering portion protruding from the outer surface of the case main body to decrease an external impact force to the case main body, wherein the buffering portion is connected with the fixing portion and the connecting portion, respectively; and a panel buffering portion decreasing the external impact force to the LCD panel; wherein the panel buffering portion is in contact with a bottom surface of the LCD panel.

In the packing case of the present invention, the buffering stop structure is disposed at four corners of the case main body.

In the packing case of the present invention, the fixing portion is simultaneously in contact with adjoining two side edges of the LCD panel.

In the packing case of the present invention, the connecting portion comprises at least one groove structure, the groove structure is engaged with a corresponding rib structure of the case main body.

In the packing case of the present invention, the material of the buffering stop structure is expanded polypropylene.

In the packing case of the present invention, the material of the case main body is high density polyethylene or polypropylene.

In comparison with a existing packing case, the manufacture cost of the buffering stop structure and the corresponding packing case of the present invention is lower, and the buffering effect thereof is better, so as to solve the problems of the packing case of existing technology that has higher the manufacture cost and may cause environment pollution.

For above-mention contents of the present invention can be best understood by referring to the following detailed description of the preferred embodiments and the accompanying drawings.

Figure 1:
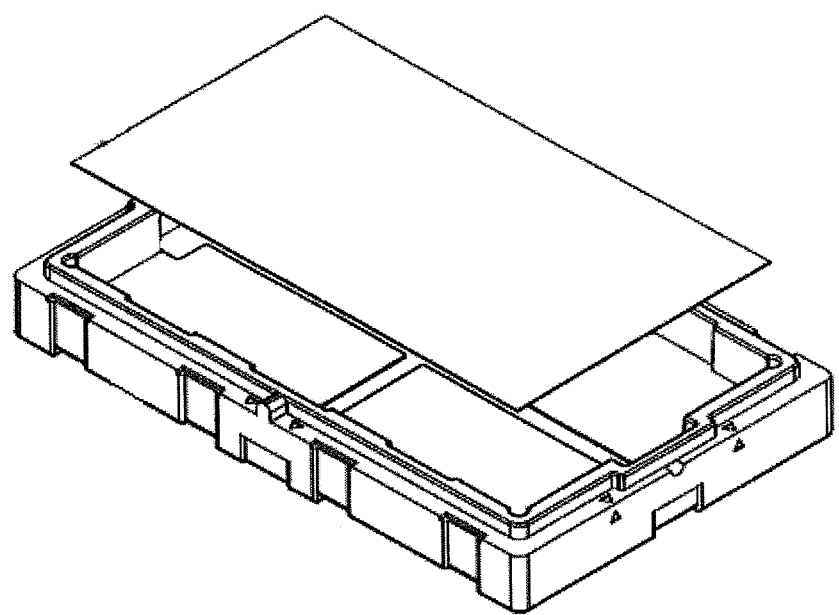
FIG. 1 is a structural schematic view of a packing case of existing technology.

In the drawings, the terms and numerals are listed, as follows:

10, case main body;
20, buffering stop structure;
21, fixing portion;
22, connecting portion;
23, case buffering portion; and
24, panel buffering portion.

DETAILED DESCRIPTION OF THE PREFERRED EMBODIMENTS

The description of the preferred embodiments refers to the drawings, so as to illustrate the specific embodiments of the present invention which can be carried out. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

In the drawings, the units with the similar structure use the same numerals.

Figure 2:
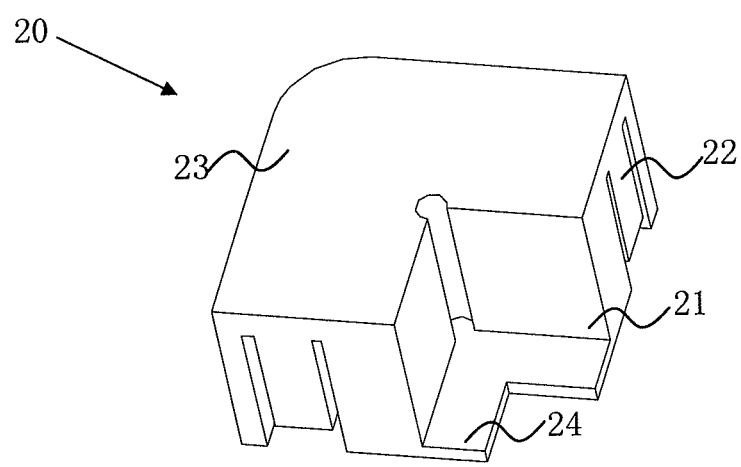
FIG. 2 is a structural schematic view of a buffering stop structure of a preferred embodiment according to the present invention.
Figure 3:
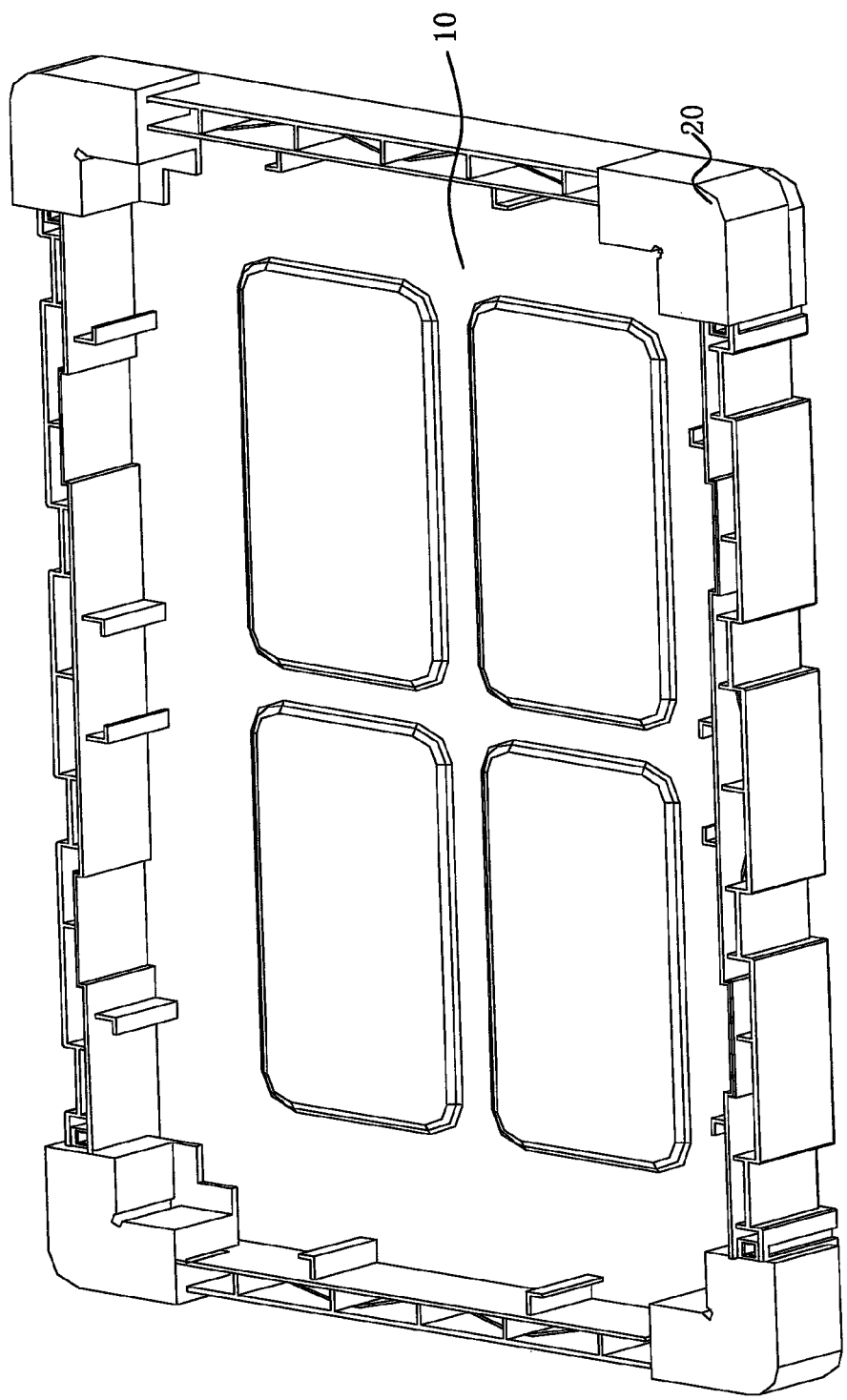
FIG. 3 is a structural schematic view of a packing case of the preferred embodiment according to the present invention.

Referring now to FIGS. 2 and 3, a structural schematic view of a buffering stop structure of a preferred embodiment according to the present invention is illustrated in FIG. 2; and a structural schematic view of a packing case of a preferred embodiment according to the present invention is illustrated in FIG. 3. As shown in these drawings, the packing case comprises a case main body 10 used to load a corresponding liquid crystal display (LCD) panel, and four buffering stop structures 20 disposed at four corners of the case main body 10 (i.e. the connecting corners between adjoining side surfaces of the case main body 10). The case main body 10 comprises one bottom surface and four side surfaces, wherein the four side surfaces are disposed at one side edge of the bottom surface, respectively, and are perpendicular to the bottom surface. The buffering stop structure 20 comprises a fixing portion 21, a connecting portion 22, a case buffering portion 23, and a panel buffering portion 24.

The fixing portion 21 is disposed inside the case main body 10. The fixing portion 21 comprises two fixing surfaces which are perpendicular to each other. One of the fixing surfaces is in contact with one side edge surface of the LCD panel; and the other fixing surface is in contact with the other side edge surface of the LCD panel. The foregoing two side edge surfaces are adjoining side edges of the LCD panel. The fixing portion 21 can clamp the LCD panel by the two fixing surfaces, and the four fixing portions 21 located at four corners of the case main body 10 are well to fix the LCD panel.

The connecting portion 22 comprises at least one groove structure, and the four corners of the case main body 10 are provided with corresponding rib structures. By engagement of the groove structures and rib structures, the buffering stop structure 20 can be firmly fixed with the case main body 10. Fox getting better fixing effect, the connecting portion 22 also can be provided with a plurality of the groove structures, and the four corners of the case main body 10 are provided with corresponding a plurality of the rib structures, so the buffering stop structures 20 can be firmly fixed with the case main body 10. However, the specific structure and number of the groove structure of the connecting portion 22 are not limited in the protecting range of the present invention. The others type of connecting portions also belong in the protecting range of the present invention, only they can firmly fix the buffering stop structure 20 and the case main body 10.

The case buffering portion 23 protrudes from the outer surface of the four corners of the case main body 10. The buffering portion 23 is connected with the fixing portion 21 and the connecting portion 22, respectively, and is used to decrease an external impact force to the case main body 10. When a drop test for the packing case loading an LCD panel is in progress, it is only the buffering portion 23 disposed at the four corners of the case main body 10 will contact with the impact surface, so as to decrease the external impact force to the case main body 10.

The panel buffering portion 24 is disposed at inside bottom portion of the buffering stop structure 20, which is in contact with the bottom surface of the LCD panel, so as to decrease the external impact force to the LCD panel. The panel buffering portion 24 can further decrease the external impact force transmitted form the case main body 10, so as to insure the safety of the LCD panel.

In the packing case according to the present invention, the purpose of the four buffering stop structures 20 disposed at four corners of the case main body 10 is to decrease the external impact force to the LCD panel, and they generally made of a material of expanded polypropylene (EPP) having better character of buffering. The case main body 10 is mainly used to contain the LCD panel, so the material of the case main body 10 is preferable been HDPE (high density polyethylene) or PP (polypropylene). These two kinds of materials both have well air-proof, water-proof and electrical isolation, so as to avoid to be influenced by external environment. Besides, the prices of these two kinds of materials are cheaper. It can decrease the usage quantity of EEP, higher price but better buffering, so that it can further lower the manufacture cost of the packing case, and insure the buffering effect of the packing case (mainly achieved by the buffering stop structure 20) and well separation effect between the packed LCD panel and external environment (mainly achieved by case main body 10).

When the packing case is in use: firstly, to install the four buffering stop structures 20 to the four corners of the case main body 10 by firm connecting between the groove structure of the connecting portion 22 and the rib structure of the case main body 10, and the panel buffering portion 24 of the buffering stop structure 20 is disposed at inside bottom portion of the case main body 10; then, to put the corresponding LCD panel into the case main body 10, and each of the fixing portions 21 of the buffering stop structures 20 is contact with the adjoining two side surfaces of the LCD panel (namely, two ends of the side edge of the LCD panel are contact with one of the fixing surfaces of the fixing portion 21), so as to well fix the LCD panel into the case main body 10. Meanwhile, the panel buffering portion 24 of the buffering stop structure 20 are contact with the bottom surfaces of the four corners of the LCD panel, so that the LED panel will not directly contact with the bottom surface of the case main body 10, so as to strengthen the buffering effect of the buffering stop structure 20 (the buffering effect of the material of the case main body 10 is weaker than the buffering effect of the buffering stop structure 20).

When the packing case suffer the external impact force, the buffering portion 23 of the buffering stop structure 20 will suffer the impact force, and then the impact force will be transmitted from the buffering portion 23 to the case main body 10 (by connecting portion 22) or the LCD panel (by the fixing portion 21), and the impact force transmitted to the case main body 10 will be transmitted to the LCD panel by the panel buffering portion 24. Hence, the external impact force is decreased by the buffering stop structure 20, so as to achieve the best buffering effect.

The buffering stop structures and corresponding packing case according to the present invention separate the buffering portions and separation portion, so it can substantially lower the manufacture cost of the packing case, and has better effect in buffering, fixing, water-proof, air-proof and electrical isolation, so as to solve the problems of the packing case of existing technology that has higher manufacture cost and may cause environment pollution.

As described above, the present invention has been described with a preferred embodiment thereof and it is understood that many changes and modifications to the described embodiment can be carried out without departing from the scope and the spirit of the invention that is intended to be limited only by the appended claims.

The invention claimed is:

1. A buffering stop structure, which is disposed at a connecting corner between adjoining side surfaces of a case main body, wherein the case main body loads a corresponding liquid crystal display (LCD) panel, and the buffering stop structure comprises:
a fixing portion disposed inside the case main body, and contacted with the corresponding LCD panel to fix the LCD panel;
a connecting portion connected with the case main body; and
a case buffering portion protruding from the outer surface of the case main body to decrease an external impact force to the case main body, wherein the buffering portion is connected with the fixing portion and the connecting portion, respectively;
wherein the buffering stop structure are disposed at four corners of the case main body;
wherein the fixing portion is simultaneously in contact with adjoining two side edges of the LCD panel; and
wherein the connecting portion comprises at least one groove structure, the groove structure is engaged with a corresponding rib structure of the case main body.

2. The buffering stop structure according to claim 1, wherein the buffering stop structure further comprises a panel buffering portion, which decreases the external impact force to the LCD panel; and the panel buffering portion is in contact with a bottom surface of the LCD panel.

3. The buffering stop structure according to claim 1, wherein the material of the buffering stop structure is expanded polypropylene.

4. A buffering stop structure, which is disposed at a connecting corner between adjoining side surfaces of a case main body, wherein the case main body loads a corresponding liquid crystal display (LCD) panel, and the buffering stop structure comprises:
a fixing portion disposed inside the case main body, and contacted with the corresponding LCD panel to fix the LCD panel;
a connecting portion connected with the case main body; and
a case buffering portion protruding from the outer surface of the case main body to decrease an external impact force to the case main body, wherein the buffering portion is connected with the fixing portion and the connecting portion, respectively.

5. The buffering stop structure according to claim 4, wherein the buffering stop structure is disposed at four corners of the case main body.

6. The buffering stop structure according to claim 5, wherein the fixing portion is simultaneously in contact with adjoining two side edges of the LCD panel.

7. The buffering stop structure according to claim 4, wherein the connecting portion comprises at least one groove structure, the groove structure is engaged with a corresponding rib structure of the case main body.

8. The buffering stop structure according to claim 4, wherein the buffering stop structure further comprises a panel buffering portion, which decreases the external impact force to the LCD panel; and the panel buffering portion is in contact with a bottom surface of the LCD panel.

9. The buffering stop structure according to claim 4, wherein the material of the buffering stop structure is expanded polypropylene.

10. A packing case, comprising:
a case main body, which is used to load a corresponding LCD panel, and comprises a bottom surface and four side surface, wherein the four side surfaces are disposed at one side edge of the bottom surface, respectively, and are perpendicular to the bottom surface; and
a buffering stop structure, which is disposed at a connecting corner between adjoining side surfaces of a case main body, and comprises:
a fixing portion disposed inside the case main body, and contacted with the corresponding LCD panel to fix the LCD panel;
a connecting portion connected with the case main body;
a case buffering portion protruding from the outer surface of the case main body to decrease an external impact force to the case main body, wherein the buffering portion is connected with the fixing portion and the connecting portion, respectively; and a panel buffering portion decreasing the external impact force to the LCD panel; wherein the panel buffering portion is in contact with a bottom surface of the LCD panel.

11. The packing case according to claim 10, wherein the buffering stop structure is disposed at four corners of the case main body.

12. The packing case according to claim 11, wherein the fixing portion is simultaneously in contact with adjoining two side edges of the LCD panel.

13. The packing case according to claim 10, wherein the connecting portion comprises at least one groove structure, the groove structure is engaged with a corresponding rib structure of the case main body.

14. The packing case according to claim 10, wherein the material of the buffering stop structure is expanded polypropylene.

15. The packing case according to claim 10, wherein the material of the case main body is high density polyethylene or polypropylene.

* * * * *